US009792622B2

(12) United States Patent
Jung et al.

(10) Patent No.: US 9,792,622 B2
(45) Date of Patent: Oct. 17, 2017

(54) COMMUNICATING DEVICE DATA PRIOR TO ESTABLISHING WIRELESS POWER CONNECTION

(71) Applicant: BROADCOM CORPORATION, Irvine, CA (US)

(72) Inventors: Sewook Jung, San Diego, CA (US); Joby Paily Aliyath, Karnataka (IN); Lih-Feng Tsaur, San Diego, CA (US); Prasad Alva Karinka, Karnataka (IN); Amrit Swarup Devulapalli, Karnataka (IN); Xianbo Chen, San Diego, CA (US); Gang He, San Diego, CA (US); Charlie Xiao, San Diego, CA (US); Erik John Rivard, San Diego, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 129 days.

(21) Appl. No.: 14/479,263

(22) Filed: Sep. 5, 2014

(65) Prior Publication Data

US 2015/0066640 A1    Mar. 5, 2015

Related U.S. Application Data

(60) Provisional application No. 61/873,968, filed on Sep. 5, 2013.

(51) Int. Cl.
*G06F 1/00* (2006.01)
*G06Q 30/02* (2012.01)

(52) U.S. Cl.
CPC ................ *G06Q 30/0251* (2013.01)

(58) Field of Classification Search
CPC ................ H02J 7/0003; G06Q 30/0251
(Continued)

(56) References Cited

U.S. PATENT DOCUMENTS

| 7,174,452 B2 * | 2/2007 | Carr ................ H04L 29/06027 380/255 |
| 7,324,516 B2 * | 1/2008 | Daniel ................ H04L 69/08 370/392 |

(Continued)

FOREIGN PATENT DOCUMENTS

IL    WO 2013102908 A1 *    7/2013    .............. H02J 5/005

OTHER PUBLICATIONS

Tseng, et al., "Introduction to the Alliance for Wireless Power Loosely-Coupled Wireless Power Transfer System Specifrication Version 1.0," IEEE Wireless Power Transfer Conference 2013, Technologies, Systems and Applications, May 15-16, 2013.

*Primary Examiner* — Aurel Prifti
(74) *Attorney, Agent, or Firm* — McDermott Will & Emery LLP (57) ABSTRACT

A power transmitting device includes a processor circuit. The processor circuit receives messages, such as advertising messages and/or scan response messages, from power receiving devices. The messages include device specific data that pertains to the corresponding power receiving devices that transmitted the messages. The device specific data includes, for example, data pertaining to the hardware, firmware, charging state, and/or device state of the corresponding power receiving device. The processor circuit selects one of the power receiving devices based in part on the device specific data contained in the messages. The processor circuit initiates a wireless power transfer connection to the selected one of the power receiving devices.

18 Claims, 5 Drawing Sheets

(58) Field of Classification Search
USPC .......... 320/106; 307/104; 323/355; 370/392;
713/320
See application file for complete search history.

(56) References Cited

U.S. PATENT DOCUMENTS

| | | | | |
|---|---|---|---|---|
| 7,989,986 B2* | 8/2011 | Baarman | ................ | H02J 7/025 307/104 |
| 8,185,755 B2* | 5/2012 | Yamasuge | ............ | H04W 8/30 323/355 |
| 8,946,939 B2* | 2/2015 | Drennen | ................ | H02J 5/005 307/104 |
| 2007/0103110 A1* | 5/2007 | Sagoo | ................... | H02J 7/025 320/109 |
| 2007/0123303 A1* | 5/2007 | Book | .................. | H02J 7/0003 455/557 |
| 2008/0025308 A1* | 1/2008 | Morgan | ................ | H04L 69/16 370/392 |
| 2008/0211458 A1* | 9/2008 | Lawther | ................ | H02J 7/025 320/132 |
| 2009/0097486 A1* | 4/2009 | Carlini | ............ | H04L 29/12801 370/392 |
| 2009/0300350 A1* | 12/2009 | Gai | ..................... | H04L 12/4645 713/160 |
| 2010/0036773 A1* | 2/2010 | Bennett | ............. | G06Q 20/3674 705/67 |
| 2011/0127954 A1* | 6/2011 | Walley | ................ | H01M 2/0267 320/108 |
| 2011/0221391 A1* | 9/2011 | Won | ...................... | H01M 10/44 320/108 |
| 2012/0155349 A1* | 6/2012 | Bajic | ................. | H04W 4/008 370/311 |
| 2014/0266025 A1* | 9/2014 | Jakubowski | ........... | H02J 7/025 320/108 |
| 2015/0048780 A1* | 2/2015 | Listl | ..................... | H01M 10/441 320/106 |
| 2015/0214745 A1* | 7/2015 | Yoon | ...................... | H02J 17/00 307/104 |

* cited by examiner

| Length | AD Type | Company ID | Data Version | Data |
|---|---|---|---|---|
| 1 Byte | 1 Byte | 2 Bytes | 1 Byte | 0-26 Bytes |
| | 0xFF | 0x000F | | |

- 202: Company ID
- 204: Data Version
- 206: Data

FIG. 2B (200B)

| Length | Manufacturer Specific data (AD Type) | Company ID | Data Version | Data (6 Bytes) | | | | |
|---|---|---|---|---|---|---|---|---|
| | | | | HW Version | Patch Version | Boot State (WPT or Battery) | OTAFU enable | Reserved | WPT Vendor ID |
| 1 Byte | 1 Byte | 2 Bytes | 1 Byte | 26 bits | 10 bits | 1 bit | 1 bit | 2 bits | 1 Byte |
| 0x0A | 0xFF | 0x000F | 0x00 | | | | | | |

- 222: HW Version
- 223: Boot State (WPT or Battery)
- 224: OTAFU enable
- 226: WPT Vendor ID

FIG. 2C (200C)

| Length | Manufacturer Specific data (AD Type) | Company ID | Data Version | Data (6 Bytes) | | | | | | Additional Data |
|---|---|---|---|---|---|---|---|---|---|---|
| | | | | HW Vers. | Patch Vers. | Boot State (WPT or Battery) | OTAFU enable | Reserved | WPT Vendor ID | Data version specific data |
| 1 Byte | 1 Byte | 2 Bytes | 1 Byte | 26 bits | 10 bits | 1 bit | 1 bit | 2 bits | 1 Byte | 0-20 Bytes |
| 0x0A-0x1E | 0xFF | 0x000F | 0x01-0xFF | | | | | | | |

- 242: Additional Data
- 243: Data version specific data
- 244: WPT Vendor ID
- 246: 0-20 Bytes

COMMUNICATING DEVICE DATA PRIOR TO ESTABLISHING WIRELESS POWER CONNECTION

CROSS-REFERENCE TO RELATED APPLICATIONS

The present application claims the benefit of U.S. Provisional Patent Application No. 61/873,968, entitled "Communicating Manufacturer Specific Data," filed on Sep. 5, 2013, which is hereby incorporated by reference in its entirety for all purposes.

TECHNICAL FIELD

The present description relates generally to communicating data, including communicating device data prior to connection establishment.

BACKGROUND

To establish a communication link, a first device may scan for a second device. In the example of wireless power transmission, the first device may be referred to a power transmitting unit (PTU) and the second device may be referred to as a power receiving unit (PRU). The PTU may be configured to wirelessly charge one or more PRUs upon establishing a link and/or connection with the one or more PRUs. In one or more implementations, the PTU may use passive scanning or active scanning to identify a proximal PRU and establish a link with the PRU. In passive scanning, the receiver of the PTU listens for advertising information, such as an advertising message, that may be transmitted by one or more proximal PRUs. In active scanning, the transmitter of the PTU transmits a request for advertising information, such as a scan request message, that may be received by any proximal PRUs. A PRU that receives the request may respond by transmitting advertising information to the PTU, such as a scan response message. The PTU may receive a message from one of the PRUs and may attempt to establish a connection with the PRU.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1A:
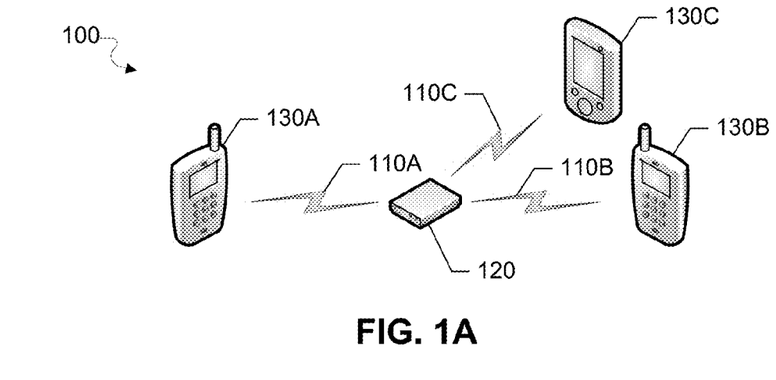
FIG. 1A illustrates an example network environment in which a system for communicating device data prior to connection establishment may be implemented in accordance with one or more implementations.

FIG. 1A illustrates an example network environment 100 in which a system for communicating device data prior to connection establishment may be implemented in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The network environment 100 includes a power transmitting unit (PTU) 120 and one or more power receiving units (PRUs) 130A-C. In one or more implementations, the PTU 120 may be referred to as a power transmitting device 120. In one or more implementations, one or more of the PRUs 130A-C may be referred to as one or more power receiving devices 130A-C. The PTU 120 and/or one or more of the PRUs 130A-C may be, may include, and/or may be part of, a desktop computer, a laptop computer, a tablet computer, a phone, a wearable device, such as smart glasses, a smart watch, an arm band, a smart shoe, or generally any device that may be configured to wirelessly receive and/or transmit power. The PTU 120 may be communicably coupled one or more of the PRUs 130A-C via one or more wireless connections 110A-C, such as a wireless power transfer connection for wireless charging. In one or more implementations, one or more of the PRUs 130A-C may be configured to be wirelessly charged, for example, in accordance with Alliance for Wireless Power (A4WP) standards. In one or more implementations, the wireless connections 110A-C may be used to transfer data, such as control information or other data, between the PTU 120 and one or more of the PRUs 130A-C and/or to transfer power between the PTU 120 and one or more of the PRUs 130A-C.

In one or more implementations, before establishing a connection and/or link with the PTU 120, one or more of the PRUs 130A-C may transmit advertising messages to the PTU 120. The advertising messages may include device specific data corresponding to the one or more PRUs 130A-C. The device specific data may include, for example, data pertaining to the hardware of the corresponding one of the PRUs 130A-C, data pertaining to the firmware of the corresponding one of the PRUs 130A-C, data pertaining to a charging state of the corresponding one or more of the PRUs 130A-C, a company identifier corresponding to the manufacturer of the corresponding one or more of the PRUs 130A-C, or generally any device specific data pertaining to the corresponding one or more of the PRUs 130A-C. The PTU 120, e.g. operating in a passive scanning mode, may receive one or more of the advertising messages and may select one of the PRUs 130A-C to initiate a connection with based at least in part on the device specific data included in the advertising messages. In one or more implementations, the PTU 120 may take different actions, such as request specific data or cancel the connection attempt, based at least in part on the device specific data contained in the advertising messages.

In one or more implementations, the PTU 120 may operate in an active scanning mode where the PTU 120 transmits a scan request message that may be received by one or more of the PRUs 130A-C. The one or more of the PRUs 130A-C that receives the scan request message may respond with a scan response message that includes the device specific data. Thus, the device specific data may be received by the PTU 120 in an unsolicited advertising message and/or in a solicited scan response message. In one or more implementations, the scan response message transmitted by one or more of the PRUs 130A-C may be the same size and/or have the same maximum size as the advertising message transmitted by one or more of the PRUs 130A-C. However, according to certain protocols such as Bluetooth, the scan request and scan response messages may be optional and therefore not guaranteed messages. Thus, for one or more implementations utilizing such protocols, the device specific data may be transmitted via the advertising messages.

The flexible interaction between the PTU 120 and the PRUs 130A-C, utilizing advertising messages that contain device specific data, allows the PTU 120 to determine whether to establish a connection with one or more of the PRUs 130A-C without sending additional requests for information beyond the advertising message. In one or more implementations, the company identifier, hardware information and/or firmware information of the device specific data may be used by the PTU 120 to determine one of the PRUs 130A-C to establish a connection with.

In one or more implementations, the PTU 120 may not need to look up the additional information about one or more of the PRUs 130A-C, for example, in a generic attribute profile (GATT) database (DB), thereby reducing the GATT DB browsing time. In one or more implementations, the PTU 120 may avoid a cross connection check by checking the boot state of device specific data corresponding to one or more of the PRUs 130A-C to determine if wireless charging has started. The PTU 120 can select one or the PRUs 130A-C for wireless charging before making the connection to avoid a cross connection check after the connection is made. In one or more implementations, by checking the firmware information contained in the device specific data, the PTU 120 can determine if a firmware update is needed and/or supported by corresponding one of the PRUs 130A-C, such that the PTU 120 can update the firmware of the one of the PRUs 130A-C before waking an application processor or operating system of the one of the PRUs 130A-C.

In one or more implementations, multiple manufacturers may provide components for one or more of the PRUs 130A-C. For example, a Bluetooth hardware manufacturer and the wireless power transmitter manufacturer of one or more of the PRUs 130A-C may be different. However, in one or more implementations the GATT DB may have only one manufacturer listed in the device information service for one or more of the PRUs 130A-C. Thus, the device specific data of the advertising message may be used to convey information corresponding to each of the different manufacturers, such as a company identifier for the Bluetooth hardware manufacturer and a wireless power transmitter vendor identifier for the wireless power transmitter manufacturer.

Figure 1B:
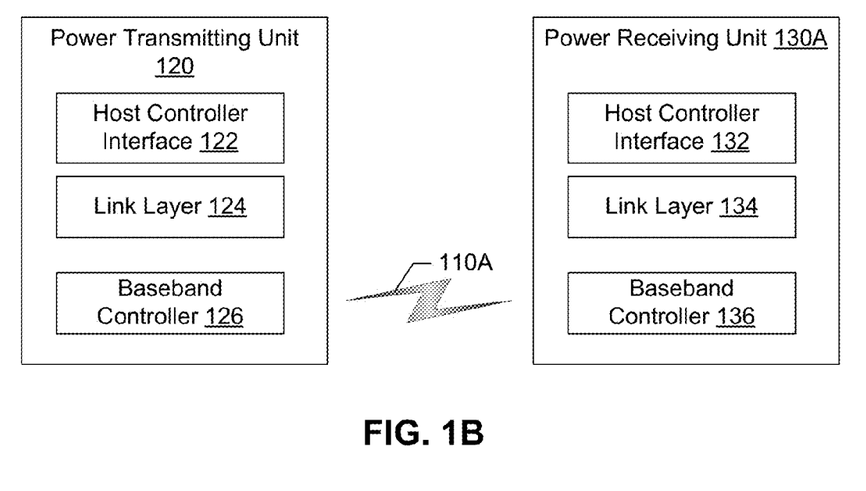
FIG. 1B illustrates an example power transmitting unit and an example power receiving unit in a system for communicating device data prior to connection establishment in accordance with one or more implementations.

FIG. 1B illustrates an example power transmitting unit 120 and an example power receiving unit 130B in a system for communicating device data prior to connection establishment in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The PTU 120 includes a host controller interface (HCI) 122, a link layer (LL) 124, and a baseband controller 126. The HCI 122 interfaces with the LL 124, and the LL 124 interfaces with the baseband controller 126. The baseband controller 126 may be further coupled to one or more antennas. The PRU 130A includes an HCI 132, an LL 134, and a baseband controller 136. The HCI 132 interfaces with the LL 134, and the LL 124 interfaces with the baseband controller 136. The baseband controller 136 may be further coupled to one or more antennas. In one or more implementations, the PTU 120 and the PRU 130A may communicate through the HCI 122 communicating with the LL 134, and through the HCI 132 communicating to the LL 124.

In the active scanning mode, the PTU 120 may request an advertising message from any proximal devices, such as by transmitting a scan request message. The PRU 130A may receive the scan request message and may transmit a response, such as a scan response message, that contains device specific data. In the passive scanning mode, the PRU 130A may generate and broadcast an advertising message that contains device specific data, which the PTU 120 may receive. An example process of generating and transmitting an advertising message by the PRU 130A is discussed further below with respect to FIG. 3A. The advertising message may have a fixed size or a maximum size, such as 31 bytes. Example advertising messages are discussed further below with respect to FIGS. 2A-C.

The PTU 120 may receive the advertising message and may determine whether to select the PRU 130A for connection initiation based at least in part on the device specific data contained in the advertising message. Upon selecting the PRU 130A, the PTU 120 may initiate the connection 110A with the PRU 130A. An example process of the selection of one of the PRUs 130A-C for connection by the PTU 120 is discussed further below with respect to FIG. 3B.

Figure 2A:
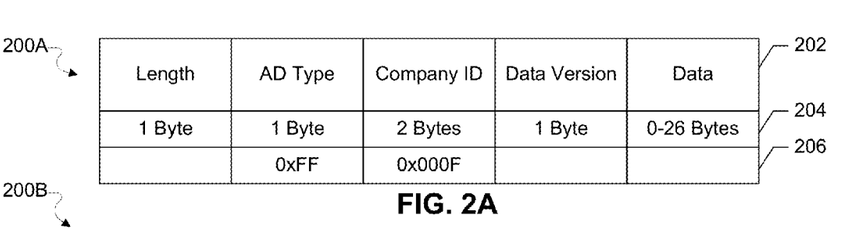
FIG. 2A illustrates an example advertising message in a system for communicating device data prior to connection establishment in accordance with one or more implementations.

FIG. 2A illustrates an example advertising message 200A in a system for communicating device data prior to connection establishment in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The advertising message 200A includes fields 202, field sizes 204, and field values 206. As shown in FIG. 2A, the size of the length field is 1 byte, the size of the advertising data (AD) type field is 1 byte, the size of the company identifier (ID) field is 2 bytes, the size of the data version field is 1 byte, and the size of the data field is 0-26 bytes, for a maximum of 31 bytes. In one or more implementations, the advertising message 200A may be transmitted by one or more of the PRUs 130A-C to the PTU 120. In one or more implementations, all or part of the advertising message 200A may be included in a scan response message that is transmitted by one or more of the PRUs 130A-C to the PTU 120.

In one or more implementations, the AD type of the advertising message 200A may be configured to different types, such as service advertising data, local name advertising data, flags advertising data, manufacturer specific advertising data, transmission power advertising data, security manager out of band advertising data, security manager advertising data, secondary connection interval range advertising data, service solicitation advertising data, and/or others. The AD types may map to values populated in the AD type field such that the AD type of the advertising message 200A is configured by setting the AD type field to the corresponding value. For example, in the generic attribute profile (GATT), such as the GATT used by the Bluetooth specification, the format value for manufacturer specific data AD type is 0xFF, as illustrated in FIG. 2A. In one or more implementations, other AD types may be used.

The manufacturer specific AD format includes the company ID field, the data version field, and the data field. The data version field determines the size and/or format of the data field. The company ID is reserved for the manufacturer that manufactured the device transmitting the advertising message 200A, such as the PRU 130A. For example, the manufacturer may be the chip maker and/or the supplier of the wireless chip of the device transmitting the advertising message 200A. In one or more implementations, manufacturers may sell their communication devices to licensees who incorporate the communication devices into commercial products. Since the company ID is reserved for the manufacturer, the licensee information may not be provided in the advertising message 200A.

In one or more implementations, the data field may be used to provide device specific data, such as information relating to the licensee, information pertaining to the state of the device, the hardware/firmware of the device, etc., as is discussed further below with respect to FIGS. 2B-C. The data version field may be toggled between different version values to format the data field into different formats.

Figure 2B:
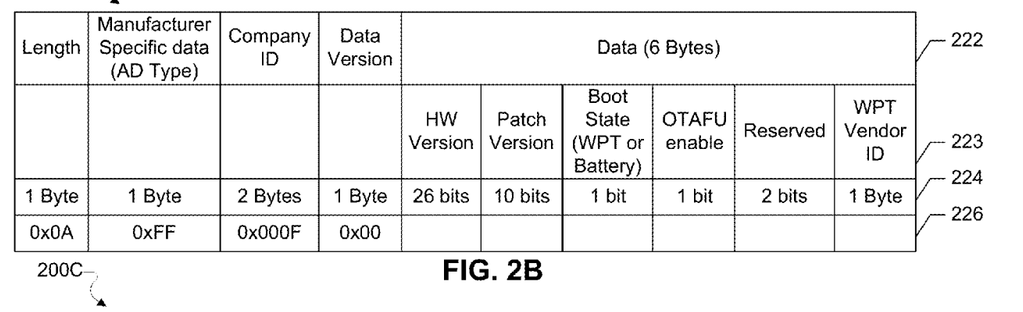
FIG. 2B illustrates an example advertising message including device specific data in a system for communicating device data prior to connection establishment in accordance with one or more implementations.

FIG. 2B illustrates an example advertising message 200B in a system for communicating device data prior to connection establishment in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The advertising message 200B may include fields 222, subfields 223, field sizes 224, and field values 226. In one or more implementations, the version value, such as 0x00, may correspond to licensee information. In one or more implementations, when the data version is set to 0x00, the data field may be formatted with the subfields 223 of the advertising message 200B, which may include device specific data such as hardware (HW) version, patch version, boot state, over the air firmware update (OTAFU) enable, reserved, and wireless power transmitter (WPT) vendor ID. In one or more implementations, the boot state may correspond to a power supply type, such as WPT or battery of the device transmitting the advertising message 200B. In one or more implementations, the boot state may indicate whether the device transmitting the advertising message 200B has already initiated wireless charging. In one or more implementations, the HW version may correspond to the hardware version or read-only-memory (ROM) version used by the licensee. In one or more implementations, the advertising message 200B may be transmitted by one or more of the PRUs 130A-C to the PTU 120. In one or more implementations, all or part of the advertising message 200B may be included in a scan response message that is transmitted by one or more of the PRUs 130A-C to the PTU 120.

In one or more implementations, the HW version may comprise 17 bits for values from 0-99999, 5 bits for a HW revision number for values from A-Z, and 4 bits for a ROM revision number for values from 0-15. In one or more implementations, the patch version may comprise 10 bits for values from 0-1023. In one or more implementations, the boot state may be a single bit, which when set (value of 1), corresponds to the WPT being on and/or wireless charging in progress. In one or more implementations, the OTAFU enable bit, when set, indicates that the PTU 120 or other central role application can update the FW of the device transmitting the advertising message 200B. In one or more implementations, one or more of the field values 226 may indicate a current firmware version of the device transmitting the advertising message 200B. The PTU 120 may then determine, based at least in part on the OTAFU enable bit and/or the current firmware version, whether the firmware of the device transmitting the advertising message 200B can and/or should be updated by the PTU 120, such as prior to awakening an application processor and/or operating system of the device transmitting the advertising message 200B.

In one or more implementations, the reserved bits may be reserved as 0, or may be redefined for another data subfield. In one or more implementations, the reserved bits may be placeholders for separating bytes from other fields. In one or more implementations, the WPT vendor ID corresponds to the WPT vendor, such that, for example, the PTU 120 can identify the vendor ID before establishing a connection with device transmitting the advertising message 200B, such as the PRU 130A. In one or more implementations, the depicted length value of 0x0A and/or the company ID value of 0x000F may correspond to a specific manufacturer. In one or more implementations, the length value of 0x0A (10) may correspond to a length or size of the advertising message 200B in bytes, which may exclude the size of the length field.

Figure 2C:
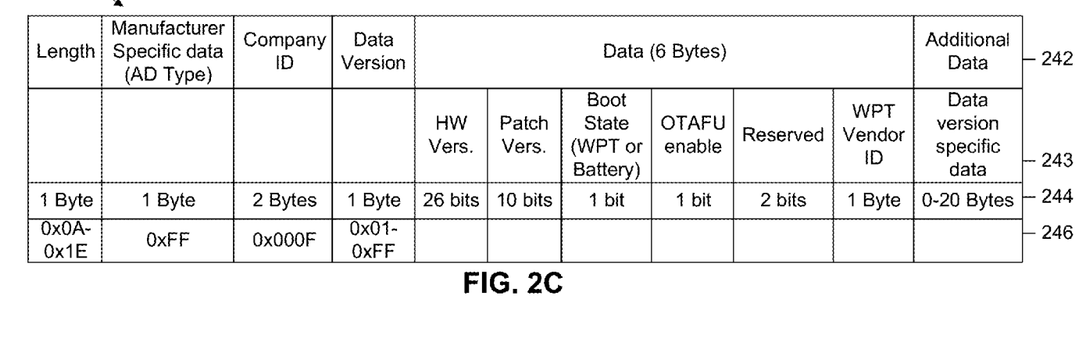
FIG. 2C illustrates an example advertising message including device specific data in a system for communicating device data prior to connection establishment in accordance with one or more implementations.

FIG. 2C illustrates an example advertising message 200C in a system for communicating device data prior to connection establishment in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The advertising message 200C may include fields 242, subfields 243, and field sizes 244 and field values 246. The data version value of the advertising message 200C is set to a value from 0x01-0xFF, which differs from the data version value of the advertising message 200B (0x00). Thus, the data field of the advertising message 200C is formatted differently than the data field of the advertising message 200B. In particular, the advertising message 200C has an additional data field which may utilize a portion or all of the remaining bytes available in the data field to transmit additional data. The length field may accordingly be set to a value from 0x0A-0x1E (10-30) based on the size of the additional data field (0-30 bytes). In one or more implementations, the additional data field may include one or more data version specific data subfields, such as to provide additional device specific data pertaining to the device transmitting the advertising message 200C. In one or more implementations, additional data subfield formats may include other additional data such as other licensee information or data defined by the licensee. In one or more implementations, the size of the advertising message may be insufficient to transfer additional data, such as licensee information or data version specific data, and the additional data may be provided via the scan request/scan response communication. In one or more implementations, the advertising message 200C may be transmitted by one or more of the PRUs 130A-C to the PTU 120. In one or more implementations, all or part of the advertising message 200C may be included in a scan response message that is transmitted by one or more of the PRUs 130A-C to the PTU 120.

In one or more implementations, there may be any number of data version values that can be mapped to any number of formats of the data field of the advertising messages 200A-C. The PTU 120 and one or more of the PRUs 130A-C may have a priori knowledge of the mappings of the data version values to the data field formats. In one or more implementations, the mappings may be stored in memories of the PTU 120 and/or one or more of the PRUs 130A-C.

Figure 3A:
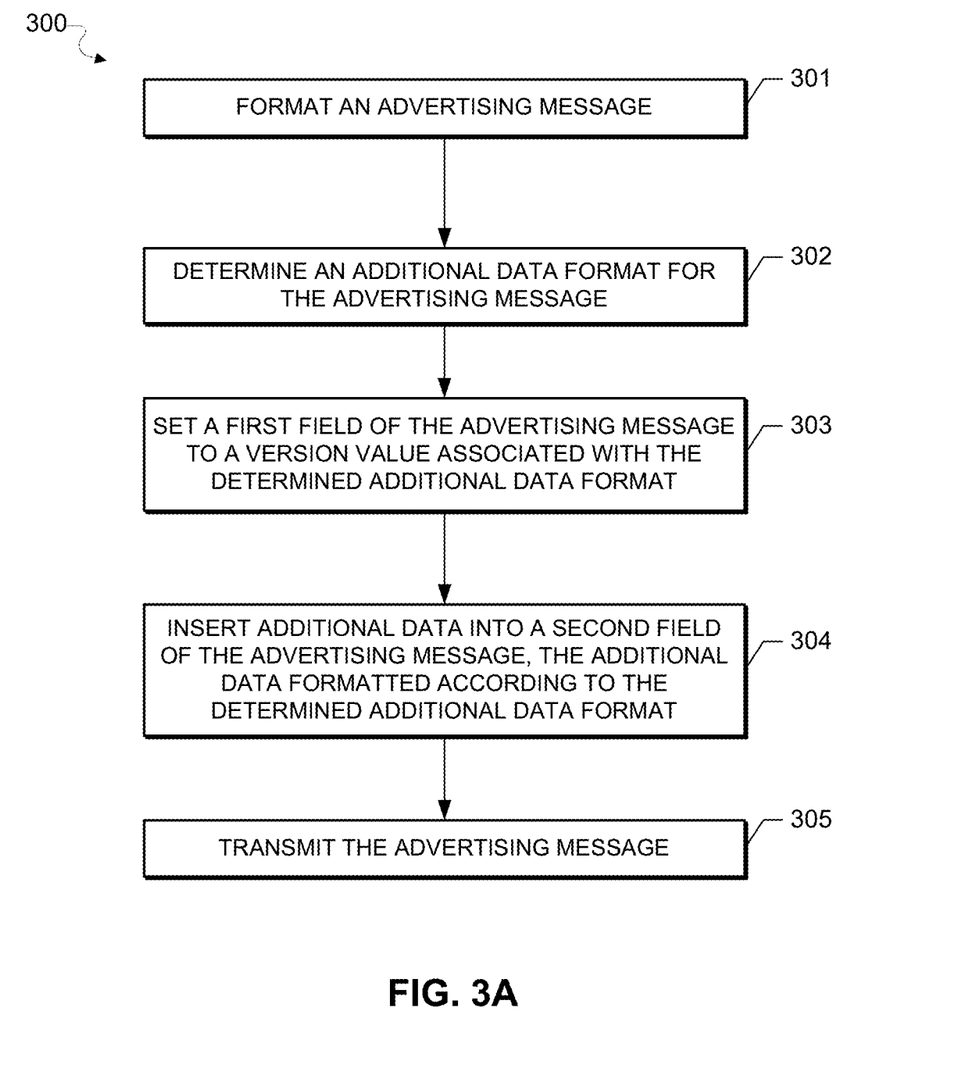
FIG. 3A illustrates an example process of a power receiving unit in a system for communicating device data prior to connection establishment in accordance with one or more implementations.

FIG. 3A illustrates an example process 300 of a power receiving unit in a system for communicating device data prior to connection establishment in accordance with one or more implementations. For explanatory purposes, the example process 300 is primarily described herein with reference to the PRU 130A of FIGS. 1 and 2; however, the example process 300 is not limited to the PRU 130A of FIGS. 1 and 2, and the example process 300 may be performed by one or more components of the PRU 130A and/or by one or more of the PRUs 130B-C. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The PRU 130A formats an advertising message, such as one or more of the advertising messages 200A-C, as a particular AD data type format, such as a manufacturer specific advertising data type format (301). In one or more implementations, the PRU 130A may format the advertising message as a manufacturer specific AD type format by setting the AD type field to a format value corresponding to the manufacturer specific AD type format.

The PRU 130A determines an additional data format for the advertising message (302). In one or more implementations, the additional data format may pertain to the format of the data field of an advertising message, such as one or more of the advertising messages 200A-C. The PRU 130A sets a first field of the advertising message, such as the data version field of the advertising messages 200A-C, to a version value associated with the determined additional data format (303). For example, the PRU 130A may set the data version field to value 0x00, corresponding to the data format shown in FIG. 2B.

The PRU 130A inserts additional data, such as device specific data, into a second field of the advertising message, such as the data field of one or more of the advertising messages 200A-C, with the additional data formatted based at least in part on the determined additional data format (304). In one or more implementations, the PRU 130A may set appropriate values into the data field, which may be further organized into subfields as shown in the advertising messages 200B-C. The PRU 130A transmits the advertising message with the additional data, such as the device specific data (305). In one or more implementations, the PRU 130A may transmit the advertising message without solicitation from the PTU 120, and/or the PRU 130A may transmit the advertising message in response to a request from the PTU 120, such as in the form of a scan response message.

Figure 3B:
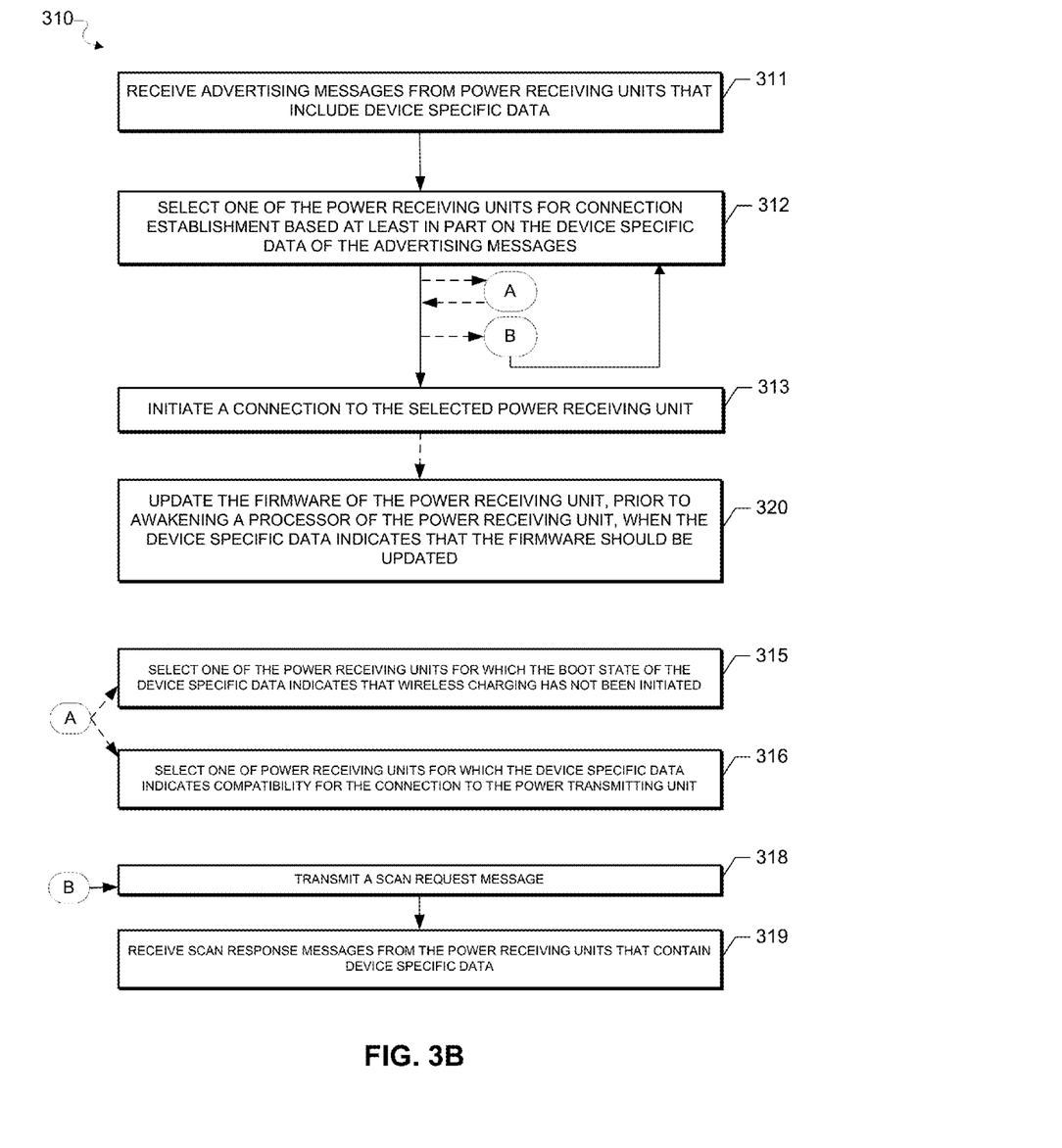
FIG. 3B illustrates an example process or a power transmitting unit in a system for communicating device data prior to connection establishment in accordance with one or more implementations.

FIG. 3B illustrates an example process 310 of a power transmitting unit in a system for communicating device data prior to connection establishment in accordance with one or more implementations. For explanatory purposes, the example process 310 is primarily described herein with reference to the PTU 120 of FIGS. 1 and 2; however, the example process 310 is not limited to the PTU 120 of FIGS. 1 and 2, and the example process 310 may be performed by one or more components of the PTU 120. Further for explanatory purposes, the blocks of the example process 310 are described herein as occurring in serial, or linearly. However, multiple blocks of the example process 310 may occur in parallel. In addition, the blocks of the example process 310 may be performed a different order than the order shown and/or one or more of the blocks of the example process 310 may not be performed.

The PTU 120 receives advertising messages from power receiving units, such as one or more of the PRUs 130A-C, that include device specific data (311). In one or more implementations, the advertising messages may include one or more of the advertising messages 200A-C with the data field formatted to include device specific data. The PTU 120 selects one of the power receiving units for connection establishment based at least in part on the device specific data contained in the received advertising messages (312). In one or more implementations, the PTU 120 may select one of the power receiving units for which the boot state of the corresponding device specific data indicates that wireless charging has not been initiated by the power receiving unit (315). In one or more implementations, the PTU 120 may select one of the power receiving units for which the corresponding device specific data indicates a compatibility for a connection to the PTU 120 (316). The PTU 120 may determine the compatibility of the power receiving unit for connection based at least in part on, for example, a hardware version, a patch version, a firmware version, and/or a wireless power transfer vendor identifier contained in the device specific data of the advertising message. The PTU 120 then initiates a connection and/or establishes a link with the selected power receiving unit (313), such as a connection and/or link for wireless power transfer.

The PTU 120 may also determine, based at least in part on the device specific data, whether the firmware of the selected power receiving unit should be and/or can be updated. For example, the PTU 120 may determine whether the OTAFU enable bit of the device specific data is set and/or whether the firmware version of the device specific data corresponds to the most recent firmware version. If the PTU 120 determines that the OTAFU bit is enabled, and/or that the firmware version indicates that the firmware is outdated, the PTU 120 updates the firmware of the power receiving unit prior to awakening a processor and/or operating system of the power receiving unit (320).

If, after receiving the advertising messages (311), the PTU 120 does not have enough information to select one of the power receiving units (312), and/or cannot identify an appropriate power receiving unit for selection (312), the PTU 120 may transmit a scan request message (318). The PTU 120 may then receive one or more scan response messages from one or more power receiving units, such as one or more of the PRUs 130A-C, that may contain device specific data (319). The PTU 120 may use the device specific data contained in the received scan response messages and/or device specific data contained in any received advertising messages, to select one of the power receiving units to initiate a connection with.

Figure 4:
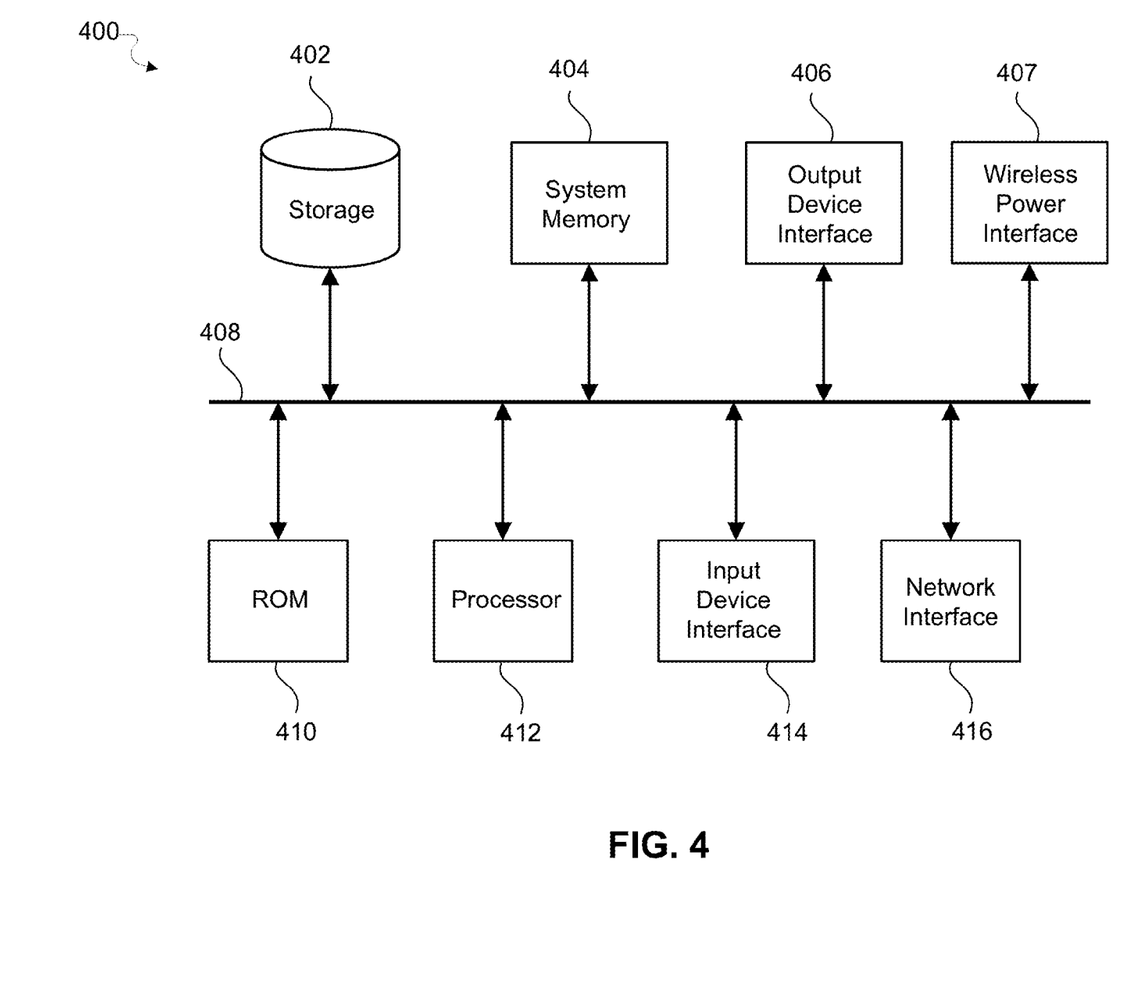
FIG. 4 conceptually illustrates an electronic system with which one or more implementations of the subject technology can be implemented.

FIG. 4 conceptually illustrates an electronic system 400 with which one or more implementations of the subject technology may be implemented. The electronic system 400, for example, can be all or part of a power transmitting unit, such as the PTU 120, a power receiving unit, such as one or more of the PRUs 130A-C, a network device, a desktop computer, a laptop computer, a tablet computer, a server, a switch, a router, a base station, a receiver, a phone, a wearable device, or generally any electronic device that transmits signals over a network and/or can be configured for wireless power transfer. Such an electronic system 400 includes various types of computer readable media and interfaces for various other types of computer readable media. The electronic system 400 includes a bus 408, one or more processing unit(s) 412, a system memory 404, a read-only memory (ROM) 410, a permanent storage device 402, an input device interface 414, an output device interface 406, and a network interface 416, or subsets and variations thereof.

The bus 408 collectively represents all system, peripheral, and chipset buses that communicatively connect the numerous internal devices of the electronic system 400. In one or more implementations, the bus 408 communicatively connects the one or more processing unit(s) 412 with the ROM 410, the system memory 404, and the permanent storage device 402. From these various memory units, the one or more processing unit(s) 412 retrieves instructions to execute and data to process in order to execute the processes of the subject disclosure. The one or more processing unit(s) 412 can be a single processor or a multi-core processor in different implementations.

The ROM 410 stores static data and instructions that are needed by the one or more processing unit(s) 412 and other modules of the electronic system. The permanent storage device 402, on the other hand, is a read-and-write memory device. The permanent storage device 402 is a non-volatile memory unit that stores instructions and data even when the electronic system 400 is off. One or more implementations of the subject disclosure use a mass-storage device (such as a magnetic or optical disk and its corresponding disk drive) as the permanent storage device 402.

Other implementations use a removable storage device (such as a floppy disk, flash drive, and its corresponding disk drive) as the permanent storage device 402. Like the permanent storage device 402, the system memory 404 is a read-and-write memory device. However, unlike the permanent storage device 402, the system memory 404 is a volatile read-and-write memory, such as random access memory. System memory 404 stores any of the instructions and data that the one or more processing unit(s) 412 needs at runtime. In one or more implementations, the processes of the subject disclosure are stored in the system memory 404, the permanent storage device 402, and/or the ROM 410. From these various memory units, the one or more processing unit(s) 412 retrieves instructions to execute and data to process in order to execute the processes of one or more implementations.

The bus 408 also connects to the input device interface 414 and the output device interface 406. The input device interface 414 enables a user to communicate information and select commands to the electronic system. Input devices used with the input device interface 414 include, for example, alphanumeric keyboards and pointing devices (also called "cursor control devices"). The output device interface 406 enables, for example, the display of images generated by the electronic system 400. Output devices used with the output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

In one or more implementations, the bus 408 may be further coupled to a wireless power interface 407. The wireless power interface 407 may be used for providing and/or receiving power wirelessly. In one or more implementations, the wireless power interface 407 may include and/or may be coupled to one or more coils, antennas, and or other wireless power components that facilitate energy transfer through, for example, electromagnetic induction and/or electromagnetic radiation.

Finally, as shown in FIG. 4, the bus 408 also couples the electronic system 400 to one or more networks (not shown) through one or more network interfaces 416. In this manner, the computer can be a part of one or more network of computers (such as a local area network ("LAN"), a wide area network ("WAN"), or an Intranet, or a network of networks, such as the Internet. Any or all components of the electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    receiving a plurality of unsolicited advertising messages from a plurality of power receiving units, each of the plurality of unsolicited advertising messages comprising a data field that includes device specific data, wherein at least one advertising message of the plurality of unsolicited advertising messages comprises an advertising data type field that indicates whether the data field of the at least one advertising message further includes information corresponding to an entity associated with a device that contains the at least one of the plurality of power receiving units from which the at least one advertising message was received, the entity being different than a manufacturer of the at least one of the plurality of power receiving units;
    selecting one of the plurality of power receiving units based at least in part on the device specific data of the at least some of the plurality of unsolicited advertising messages; and
    initiating a connection for wireless power transfer to the selected one of the plurality of power receiving units.

2. The method of claim 1, wherein the device specific data comprises at least one of a hardware version, a patch version, or a wireless power transfer vendor identifier.

3. The method of claim 2, wherein selecting one of the plurality of power receiving units based at least in part on the device specific data of the at least some of the plurality of unsolicited advertising messages further comprises:
    selecting one of the plurality of power receiving units for which at least one of the hardware version, the patch version or the wireless power transfer vendor identifier of the corresponding device specific data indicates that the one of the plurality of power receiving units is compatible for the connection to a power transmitting unit.

4. The method of claim 2, wherein initiating the connection to the selected one of the plurality of power receiving units further comprises:
    initiating the connection to the selected one of the plurality of power receiving units utilizing at least a portion of the device specific data corresponding to the selected one of the plurality of power receiving units.

5. The method of claim 1, wherein the device specific data corresponding to each of the at least some of the plurality of power receiving units further comprises a boot state that indicates whether the each of the at least some of the plurality of power receiving units has initiated wireless charging.

6. The method of claim 5, wherein selecting the one of the plurality of power receiving units based at least in part on the device specific data of the at least some of the plurality of unsolicited advertising messages further comprises:
    selecting the one of the plurality of power receiving units for which the boot state of the corresponding device specific data indicates that the one of the plurality of power receiving units has not initiated wireless charging.

7. The method of claim 1, wherein the device specific data is further indicative of whether the selected one of the plurality of power receiving units requires a firmware update.

8. The method of claim 7, further comprising:
    updating the firmware of the power receiving unit, prior to awakening a processor of the power receiving unit, when the device specific data indicates that the power receiving unit requires the firmware update.

9. The method of claim 1, wherein an advertising data type of the at least some of the plurality of unsolicited advertising messages comprises a manufacturer specific advertising data type.

10. The method of claim 1, further comprising:
    transmitting a scan request message; and
    receiving a scan response message from at least one of the plurality of power receiving units, wherein the scan response message comprises the device specific data.

11. A power transmitting device, comprising:
    at least one processor circuit coupled to a non-transitory tangible computer-readable storage medium and configured to:
        receive messages from power receiving devices, wherein each of the messages comprises a first field indicating a message format type and a second field containing device specific wireless power transfer data formatted based on the message format type and pertaining to each of the power receiving devices the device specific wireless power transfer data comprising an identifier of a manufacturer of each of the power receiving devices;
        select one of the power receiving devices that transmitted one of the messages that indicates that wireless power transfer has not been initiated for the one of the power receiving devices and that includes the identifier of the manufacturer that indicates a compatibility for connection with the power transmitting device; and
        initiate a connection for the wireless power transfer to the selected one of the power receiving devices.

12. The power transmitting device of claim 11, wherein the messages comprise at least one of advertising messages or scan response messages.

13. The power transmitting device of claim 11, wherein the at least one processor circuit is configured to:
    update a firmware of the selected one of the power receiving devices prior to awakening a processor of the selected one of the power receiving devices when the corresponding device specific wireless power transfer data indicates that the firmware should be updated.

14. A computer program product comprising instructions stored in a non-transitory tangible computer-readable storage medium, the instructions being executable by one or more processors to perform operations, the instructions comprising:

instructions for formatting an unsolicited advertising message;

instructions for determining an additional data format for the unsolicited advertising message;

instructions for setting a first field of the unsolicited advertising message to a version value associated with the determined additional data format;

instructions for inserting additional data into a second field of the unsolicited advertising message, the additional data comprising device specific wireless power transfer data formatted according to the determined additional data format, wherein the device specific wireless power transfer data indicates a charging state; and instructions for transmitting the unsolicited advertising message.

15. The computer program product of claim 14, wherein the instructions for formatting the unsolicited advertising message comprises setting an advertising data field to a format value corresponding to a manufacturer specific advertising data type format.

16. The computer program product of claim 14, wherein the first field is a data version field, the second field is a data field, and a format of the data field corresponds to the version value.

17. The computer program product of claim 14, wherein the unsolicited advertising message is transmitted to a power transmitting unit in a passive scanning mode or the unsolicited advertising message is transmitted in response to an advertising information request from the power transmitting unit in an active scanning mode.

18. The computer program product of claim 14, wherein the additional data includes at least one of power chip information, a wireless power transmitter vendor identification (ID), an over the air firmware update information, a boot state power supply, a patch version, and a hardware version.

* * * * *